UNITED STATES PATENT OFFICE.

WILLIAM T. BONNER, OF WASHINGTON, NORTH CAROLINA, ASSIGNOR OF ONE-HALF TO K. P. McELROY AND ROY F. STEWARD, BOTH OF WASHINGTON, DISTRICT OF COLUMBIA, AND MITFORD C. MASSIE, OF NEW YORK, N. Y.

PLASTICS AND METHODS OF MAKING SAME.

1,173,336. Specification of Letters Patent. Patented Feb. 29, 1916.

No Drawing. Application filed May 20, 1908. Serial No. 433,872.

*To all whom it may concern:*

Be it known that I, WILLIAM T. BONNER, citizen of the United States, residing at Washington, in the county of Beaufort and State of North Carolina, have invented certain new and useful Improvements in Plastics and Methods of Making Same, of which the following is a specification.

This invention relates to plastics and methods of making same; and comprises plastic materials resulting from the action of ammonia ($NH_3$) and other nitrogen compounds of like type upon cellulose and similar carbohydrates; and it also comprises a process of forming valuable derivatives from carbohydrates, said process comprising a method in which the carbohydrate is molecularly altered to form new bodies by the action of ammonia or like bodies, such new bodies being in a reactive form adapting them to the formation of carbohydrate esters and also comprising a method of forming such esters and products comprising the same, all as more fully hereinafter set forth and as claimed.

I have discovered that by treating cellulose and like carbohydrates with dry ammonia ($NH_3$), the material unites with the ammonia and undergoes a profound molecular alteration though still retaining the general carbohydrate properties, and among them the valuable film- and filament-forming properties, becoming much more reactive and becoming well adapted as a material for producing esters having valuable properties, such as, for instance, the sulfocarbonate. For instance, if I take ordinary paper pulp or other forms of commercial cellulose, dry it to free it of mechanically held, or "adsorbed", moisture, and then immerse it in liquid dry ammonia a reaction at once sets in with evolution of heat. In practice I prefer to perform this reaction under cooling conditions to avoid far-going changes when seeking to produce the specific products more specifically hereinafter described. The materials may, for instance, be brought into reaction in apparatus surrounded by a cooling liquid maintained around zero Fahrenheit. After a time when the cellulose has undergone the changes desired, I remove the liquid ammonia and subject the altered cellulose to a vacuum. This removes substantially all the ammonia mechanically held as gas, and leaves my altered cellulose as a light dry powder, the fibers being generally found to be broken down to an impalpable powder. As to the chemical nature of the action which takes place in treating the carbohydrate with the $NH_3$, I am not at present aware and content myself with noting the observed facts.

The light dry powder resulting from the action of the $NH_3$ upon cellulose to the extent indicated and in the way described, is a cellulose derivative in an extremely reactive form. It should as a rule be employed while quite fresh and pending such use should be kept cool and dry and under exclusion of air to prevent loss of reactivity. It is possessed of properties which well adapt it to the formation of such esters as the acetate, nitrate, benzoate, palmitate, etc., by treatment with bodies containing or yielding negative radicals; it may indeed, in a sense, be said to act as an active basic body. It may be converted into useful acetates, butyrates, benzoates, etc., by treatment with the corresponding acids, anhydrids or acidyl chlorids. Upon treatment with very strong acetic acid, for instance, it yields useful products. It may be nitrated by nitric acid and various nitrating mixtures. It is particularly well adapted for treatment with carbon disulfid however, and such treatment and resulting products will be more specifically hereinafter described.

My invention however, broadly stated, comprises this new and useful body and the derivatives produced by combining it with, and reacting upon it by, various ester-forming substances as well as the process of producing it and its derivatives. Upon contacting this powder with carbon disulfid, either as liquid or vapor, it reacts therewith to form a light, dry, yellowish powder of a fairly permanent nature, though best preserved in a cool dry state under exclusion of air, the disulfid having entered into combination with the altered cellulose or cellulose derivatives to form a compound which is capable of forming a body upon solution in water apparently analogous in some respects to that existing in the solutions of the sodium cellulose sulfo-carbonate or viscose, but of course differing from it in containing no soda or other fixed alkali. It contains no fixed alkali, soluble salts or other mineral matter except the natural ash constituents of the cellulose employed; an amount of mineral matter insignificant for all practical purposes and of a character wholly harmless. Upon treating this yellowish product with the proper amount of water, it dissolves to form a thick, viscid solution, useful for many plastic purposes. The dry product when well made being homogeneous, the solution is likewise homogeneous, thereby differing from the ordinary carbon disulfid compounds of cellulose. It differs also in many other respects; notably in the absence of fixed mineral matter in solution. Ordinary viscose being, to state its composition empirically, a compound of caustic soda, cellulose and carbon bisulfid, is heavily alkaline and when the cellulose is recovered, the soda remains therein as an impurity which must be carefully washed out; an operation attended with some difficulty and leaving the cellulose porous and hygroscopic. Naturally if the soda be not thoroughly extracted, as frequently happens, the cellulose is quite hygroscopic.

The cellulose-carbon disulfid compound of the present invention upon being dissolved in water yields a neutral solution, the compound itself being neutral. This solution upon being heated gives recovered cellulose in a hard, tough form well adapted for plastic purposes; yielding films, filaments or substantial masses according to conditions. If the solution prior to heating be used to form a stiff, plastic mass by incorporation of neutral, indifferent mineral matters as fillers, such as whiting, zinc oxid, etc., the recovered cellulose binds these fillers into tough, strong masses of the shape of the containing vessel or mold. All the constituents of the solution other than the cellulose being volatile, upon drying such masses a finished product is obtained directly, no washing being necessary.

From the solution formed as described, cellulose may be regained or recovered by acidulation with various acids, by treating with various basic oxids and by the ordinary reagents for salting out colloid bodies. The cellulose compound in the solution not being very stable, these precipitates furnish recovered cellulose upon aging.

Heating and drying may usefully be combined into a single operation, the solution with or without fillers, being simply exposed to heat in a drying chamber. When it is desired to produce a cellulose filament or film, as in making thread or in waterproofing cloth, this operation is particularly useful. In insulating wire, for example, the wire may be continuously led through a bath of the solution, thence through a steam chamber and thence into a drying chamber. In going through the bath it becomes covered with a clinging film of the viscid solution; in steaming cellulose is regained from this film in film form, covering the wire, and all volatiles are removed from this covering film in the drying chamber, leaving pure cellulose as a hard, horny, tough film, well adapted for insulation. No washing being required, the dried wire may be directly coiled on the magnets or armatures. The covering is neither porous nor hygroscopic. Cloth may be treated in much the same manner, a strip of cloth having the solution applied to one side, or being impregnated therewith, steamed and dried. Articles may be given a hard, tough, non-porous, permanent varnish of cellulose by dipping, steaming and drying. A simple drying in lieu of steaming and drying may be employed.

When desired, the original solution may be mixed with other colloid bodies, such as casein, glue, gelatin, etc., or with hygroscopic, softening bodies, such as glycerin. The solution being free of corrosive, fixed alkalis like soda or potash, does not injuriously react on casein, gelatin, etc.

Filaments may be made from the solution by squirting it through suitable jet nozzles into acid baths, anilin baths, drying chambers, steam chambers, etc. The filaments do not require the washing necessary with most other artificial filaments.

Cloth impregnated with the solution and afterward dried, gives a good article of imitation leather. Other colloids may be simultaneously employed if desired. Leather itself may be waterproofed and filled with recovered cellulose by the aid of the described solution. The solution being free from caustic alkalis does not injuriously affect wool, leather and other animal fibrous materials.

Masses of cellulose recovered from the pure solution take the shape of the containing vessel and form hard, solid, tough bodies which may be turned, drilled and otherwise worked like horn. They are non-porous and require no washing. Other carbohydrates than cellulose may be treated in the same manner with results which are analogous though not identical. Woods and other vegetable materials may also be treated in the same manner.

Any suitable apparatus may be employed for any of the described operations. In treating the cellulose with ammonia, it is preferable to use enameled vessels to prevent staining or other contamination. As stated, provision should be made for removing heat generated in the reaction, both to avoid undue pressures, when using liquid ammonia, and to prevent the reaction going too far. Provision should also be made for removing any gas which may be evolved in the reaction. The liquid ammonia which has served for one treatment may be used for another treatment of fresh cellulose. The chief purpose in using the liquid ammonia is to have a large excess of $NH_3$ relative to the cellulose as this facilitates and quickens the action. Gaseous ammonia requires larger vessels and is slower in its action unless temperatures be raised.

The preliminary drying of the cellulose is quite desirable, and may be effected in any suitable manner and with any suitable apparatus. Drying at or near the temperature of boiling water (212° F.) for, say, half an hour, is sufficient. Any commercial form of cellulose may be employed, such as cotton, paper or ordinary wood paper pulp. The wood paper pulp is quite suitable.

The intermediate product resulting from the action of the ammonia on the cellulose may be kept, sold or used directly. The dry, yellow compound of carbon bisulfid with this product may similarly be kept, sold or used directly. Being dry, it is convenient to package and transport, and it may be employed to produce the described solution at the place of use. But, as stated, when either is to be preserved, it should be kept cool, dry and away from the action of air.

In lieu of ammonia, other anhydrous nitrogen compounds of the $NH_3$ type, such as anilin, methylamin, ethylamin, dimethylamin, trimethylamin, and the like, may be employed.

What I claim is:—

1. As a new composition of matter, a water solution of a compound of carbon disulfid with a product resulting from the treatment of a carbohydrate with an anhydrous nitrogen compound of the $NH_3$ type, said solution being neutral, coagulable and free of fixed mineral matter.

2. As a new composition of matter, a water solution of a compound of carbon disulfid with a product resulting from the treatment of cellulose with $NH_3$, said solution being neutral, coagulable and free of fixed mineral matter.

3. In the manufacture of plastic compositions, the process which comprises treating dry cellulose with an anhydrous nitrogen compound of the $NH_3$ type.

4. In the manufacture of plastic compositions, the process which comprises treating a dry carbohydrate with an anhydrous nitrogen compound of the $NH_3$ type.

5. In the manufacture of plastic compositions, the process which comprises treating a dry carbohydrate with $NH_3$.

6. In the manufacture of plastic compositions, the process which comprises treating a dry cellulose with $NH_3$.

7. In the manufacture of plastic compositions, the process which comprises treating cellulose with liquid $NH_3$.

8. The process of forming plastic compositions which comprises treating a carbohydrate with $NH_3$ and subsequently treating the product with an ester-forming body.

9. The process of forming plastic compositions which comprises treating cellulose with $NH_3$ and subsequently treating the product with an ester-forming body.

10. The process of forming plastic compositions which comprises treating a carbohydrate with $NH_3$ and subsequently treating the product with carbon disulfid.

11. The process of forming plastic compositions which comprises treating cellulose with $NH_3$ and subsequently treating the product with carbon disulfid.

12. The process of forming plastic compositions which comprises treating dry cellulose with anhydrous ammonia, treating the product of this action with carbon disulfid and dissolving in water the product so obtained.

13. The process of forming plastic compositions which comprises treating dry cellulose with liquid anhydrous ammonia, treating the product of this action with carbon disulfid and dissolving in water the product so obtained.

14. The process of forming plastic compositions which comprises treating dry cellulose with liquid anhydrous ammonia under cooling conditions, removing the excess of liquid, removing adhering ammonia by vacuum and treating the product with carbon disulfid.

15. The process of forming a plastic composition which comprises treating dry cellulose with liquid anhydrous ammonia under cooling conditions, removing the excess of ammonia, treating with carbon disulfied and dissolving the resultant compound in water.

16. As a new composition of matter, a material comprising the product of reaction of cellulose, anhydrous ammonia and an ester-forming body.

In testimony whereof I affix my signature, in presence of two witnesses.

WILLIAM T. BONNER.

Witnesses:
PHILIP T. LARNER,
ALFRED M. HOUGHTON.